(12) United States Patent
Golov

(10) Patent No.: US 11,173,921 B2
(45) Date of Patent: Nov. 16, 2021

(54) SENSOR FUSION TO DETERMINE RELIABILITY OF AUTONOMOUS VEHICLE OPERATION

(71) Applicant: Micron Technology, Inc., Boise, ID (US)

(72) Inventor: Gil Golov, Backnang (DE)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/194,722

(22) Filed: Nov. 19, 2018

(65) Prior Publication Data

US 2020/0156651 A1 May 21, 2020

(51) Int. Cl.
*B60W 50/02* (2012.01)
*G05D 1/00* (2006.01)
*B60W 50/14* (2020.01)
*B60W 50/029* (2012.01)

(52) U.S. Cl.
CPC ...... *B60W 50/0205* (2013.01); *B60W 50/029* (2013.01); *B60W 50/14* (2013.01); *G05D 1/0061* (2013.01); *G05D 1/0077* (2013.01); *G05D 1/0088* (2013.01); *B60W 2050/0215* (2013.01); *B60W 2050/0292* (2013.01); *B60W 2050/143* (2013.01); *G05D 2201/0213* (2013.01)

(58) Field of Classification Search
CPC ........... B60W 50/0205; B60W 50/029; B60W 50/14; B60W 30/16; G05D 1/0061; G05D 1/0077; G05D 1/0088; G05D 1/0278; G01S 13/931; G01S 17/023; G01S 17/936

See application file for complete search history.

(56) References Cited

U.S. PATENT DOCUMENTS

| 8,744,666 | B2 | 6/2014 | Switkes et al. |
| 9,176,500 | B1 | 11/2015 | Teller et al. |
| 9,555,740 | B1 | 1/2017 | Zhu et al. |
| 9,710,714 | B2 | 7/2017 | Chen et al. |
| 2005/0159851 | A1 | 7/2005 | Engstrom et al. |
| 2008/0150786 | A1* | 6/2008 | Breed ................. B60N 2/2863 342/53 |
| 2008/0161986 | A1 | 7/2008 | Breed |
| 2011/0282622 | A1* | 11/2011 | Canter ............... G06K 9/00691 702/150 |

(Continued)

OTHER PUBLICATIONS

Sensor fusion, Wikipedia, retrieved from https://en.wikipedia.org/wiki/Sensor_fusion on Nov. 1, 2018.

(Continued)

*Primary Examiner* — Anne Marie Antonucci
*Assistant Examiner* — Andrew J Cromer
(74) *Attorney, Agent, or Firm* — Greenberg Traurig

(57) ABSTRACT

A method for an autonomous vehicle includes: receiving first object data from a first sensor module; receiving second object data from a second sensor module; comparing the first object data to the second object data; determining, based on comparing the first object data to the second object data, whether the first object data corresponds to the second object data; and in response to determining that the first object data does not correspond to the second object data, performing an action for the autonomous vehicle.

18 Claims, 11 Drawing Sheets

(56) References Cited

U.S. PATENT DOCUMENTS

| | | |
|---|---|---|
| 2012/0143430 A1* | 6/2012 | Broggi ................ G01S 17/023 |
| | | 701/28 |
| 2013/0041576 A1 | 2/2013 | Switkes et al. |
| 2015/0241226 A1 | 8/2015 | Engelman et al. |
| 2016/0078305 A1* | 3/2016 | Higgins-Luthman .... H04N 7/18 |
| | | 348/118 |
| 2017/0015288 A1 | 1/2017 | Coelingh et al. |
| 2017/0039436 A1 | 2/2017 | Chen et al. |
| 2017/0212529 A1 | 7/2017 | Kumar et al. |

OTHER PUBLICATIONS

Sensor Fusion: The Basics, retrieved from https://www.digikey.com/en/articles/techzone/2012/apr/sensor-fusion-the-basics on Nov. 1, 2018.

Sensor Fusion—A Need for Next Generation Automobiles, TechTalk@KPIT, vol. 9, Issue 1, Jan.-Mar. 2016.

International Search Report and Written Opinion, PCT/US2019/061649, dated Mar. 15, 2020.

* cited by examiner

SENSOR FUSION TO DETERMINE RELIABILITY OF AUTONOMOUS VEHICLE OPERATION

FIELD OF THE TECHNOLOGY

At least some embodiments disclosed herein relate to computing systems for autonomous vehicles in general, and more particularly, but not limited to, the use of sensor fusion to determine the reliability of operation for sensors of an autonomous vehicle.

BACKGROUND

Autonomous vehicles typically include many sensors to assist in controlling the autonomous vehicle. In some cases, the failure of a sensor may cause an accident, collision, or near collision involving the vehicle.

Multiple sensor fusion is used in computing systems to manage imperfect inputs from an environment. Sensor fusion can use techniques such as artificial intelligence (AI), pattern recognition, digital signal processing, control theory, and statistical estimation. Data from multiple micro-electro-mechanical systems (MEMS) can be fused to provide applications with increased response and accuracy.

Advances in sensor technology and processing techniques, combined with improved hardware, make real-time fusion of sensor data possible. For example, a system can combine and integrate MEMS accelerometers, gyroscopes, pressure sensors, magnetic sensors, and microphones into multi-sensor combinations with on-board processing and wireless connectivity.

Depending on the application, fusion of data can take place in different ways, typically involving the level of complexity and the number of elements being measured. Feature-level fusion involves features that are extracted from different sensor observations or measurements and combined into a concatenated feature vector. Decision-level fusion takes information from each sensor after it has measured or evaluated a target individually.

Sensor fusion also can be centralized or decentralized depending on where the fusion of the data occurs. In centralized sensor fusion, data are forwarded to a central location to be correlated and fused. In decentralized sensor fusion, every sensor or platform has a degree of autonomy in the decision making that fusion causes.

In an example of centralized fusion, clients forward all of the data to a central location, and an entity at the central location correlates and fuses the data. In an example of decentralized fusion, clients handle all fusing of the data. Combinations of centralized and decentralized systems also exist.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
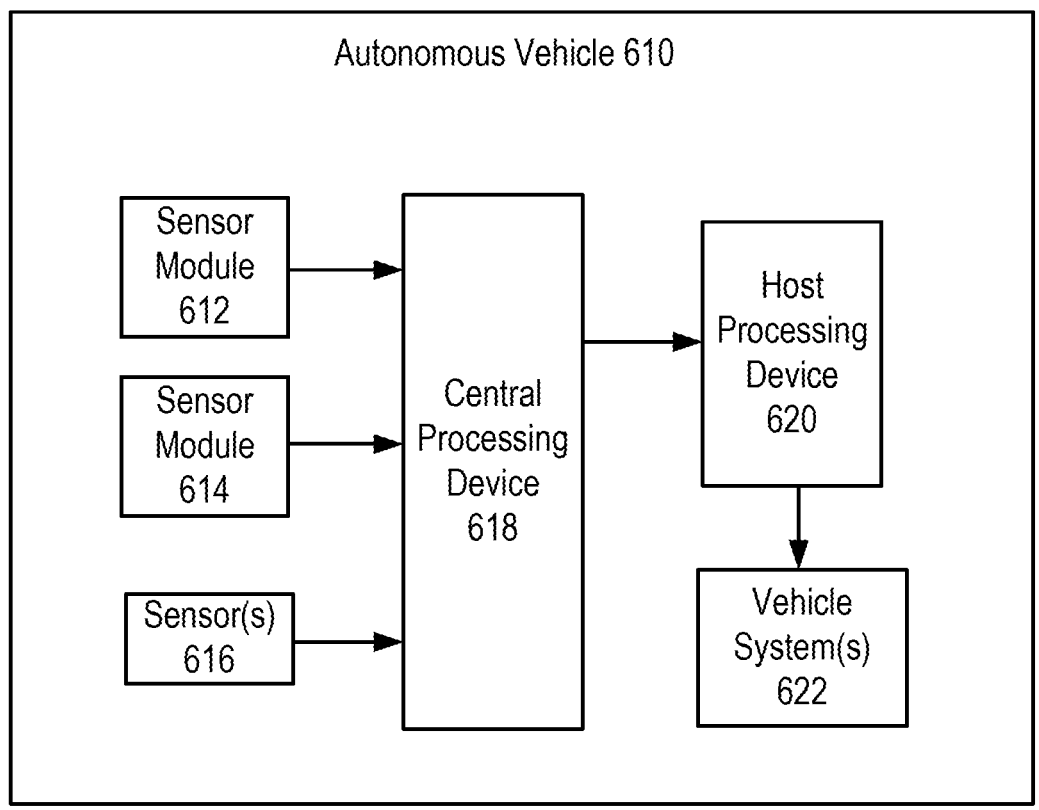
FIG. 1 illustrates an autonomous vehicle including sensor modules that provide data to a central processing device, according to one embodiment.

Proper autonomous vehicle system operation is mission critical in many cases. For example, proper vehicle navigation is critical to avoiding collisions with persons or other vehicles.

Practices regarding safe vehicle system operation are becoming more regulated. For example, the vehicle industry is adopting standardized practices for designing and testing products. One example is ISO 26262, which provides an automotive-specific international standard that focuses on safety critical components. ISO 26262 is a derivative of IEC 61508, the generic functional safety standard for electrical and electronic (E/E) systems.

Increasing complexity in the automotive industry has resulted in further efforts to provide safety-compliant systems. For example, modern automobiles use by-wire systems such as throttle-by-wire, in which a driver presses on an accelerator pedal and a sensor in the pedal sends a signal to an electronic control unit. The control unit analyzes several factors such as engine speed, vehicle speed, and pedal position. It then relays a command to a throttle body. Testing and validating systems like throttle-by-wire present a technical problem.

Existing vehicles often use full-system redundancy in order to increase the reliability of vehicle operation, and also to be compliant with automotive safety and reliability standards as ISO26262. For example, in many cases vehicles use dual or triple full-system redundancy in order to increase system's reliability and safety. In one example, existing vehicles use dual or triple redundancy in identical components. For example, two or three cameras are used to detect if any of the cameras is not working correctly; two or three radars are used to detect if any of the radars is not working correctly; and two or three lidars are used to detect if any of the lidars is not working correctly.

However, the foregoing full-system redundancy presents the technical problem that hardware needs and expense are significantly increased due to the full-system redundancy.

Also, the complexity of maintenance is increased due to the need to maintain several redundant systems.

Various embodiments disclosed herein solve the above technical problems by using smart sensors that execute local sensor data analysis in the sensors themselves and then report on detected objects. Additionally, a central sensor health analysis component (e.g., processor) determines the health state of the smart sensors by comparing the detected objects as between the sensors (e.g., compare a first sensor to a second sensor).

Although sensors such as cameras, radar, and lidar will not always detect all objects at the same time, it is expected that there will be statistical matches between the objects detected by the sensors (e.g., when looking at a data sample size that is taken over numerous object detection events). For instance, during daytime operation, it is expected that most of the time (e.g., greater than a threshold percentage of events), the camera, radar, and lidar will detect and report on objects (e.g., cars and pedestrians) that are in the same field of view. Further, for instance, during nighttime operation, radar and lidar are expected to reliably detect and report on detected objects (e.g., cars) in the same field of view.

Determining that there is a failure to maintain a statistical detection relationship (e.g., a statistical correlation within a predetermined limit) between the sensors (e.g., smart sensors) can indicate that a malfunction exists in one of the sensors, or in one of the sensor fusion processing components (e.g., the processor performing statistical correlation of object data). In response to determining that such a failure exists, various actions can be taken (e.g., operation of the vehicle can be changed). In one example, a safety hazard signal is triggered (e.g., an alert is provided to a passenger, and/or a communication is sent to a central server that monitors vehicle operation for several vehicles).

In one example, the action taken is disabling of the autonomous mode of operation of the vehicle. In one example, a person is required to take over control of the vehicle. In one example, the action is automatically stopping the vehicle, then disabling the autonomous mode.

Various embodiments herein provide the advantage of cost saving by avoiding full-system redundancy. Instead of replicating an entire vehicle operational system, a lower cost health analysis solution is provided for the sensors and sensor fusion portion of the system. This solution is provided without needing sensor and sensor fusion redundancy. For example, only that portion of the system other than the sensors and sensor fusion processing components needs to be redundant.

In one example, one advantage can be reduced cabling cost for a vehicle. For example, providing an object data result from a sensor module instead of needing to transmit high-speed raw data signals out of sensors (e.g., as required with redundant raw video data feeds) reduces the cabling requirements for the vehicle. For example, only the detected object needs to be transmitted (and not the raw data used to detect the object). This significantly lowers the bit-rate data bandwidth required by the vehicle's cabling (e.g., this avoids the need for high-speed cabling to connect smart sensor modules to a central processing component). This saves additional cost at the vehicle system level.

In one example, another advantage provided is a smaller-sized central processing component. For example, object data comparison requires significantly reduced processing power as compared to processing raw sensor data feeds in the central processing component.

In various embodiments, full-system redundancy is avoided based on statistical correlations of similar components (e.g., redundancy in components that are expected to generate the same or similar results in certain conditions in a statistical sense). For example, three different components (e.g., camera, radar and lidar) are expected to have correlations in their identified, reported objects in certain types of conditions, but not in other types of conditions (e.g., sensor modules report same or similar data on objects such as cars and pedestrians in the daytime, but not in the nighttime and/or for other different types of objects). For example, the expected statistical correlations may vary by object type (e.g., radar or light reflective object versus non-reflective object). Object types (for use in providing result data from a sensor module) can be stored in a database in, for example, a sensor module that processes raw sensor data (e.g., from a lidar).

Various embodiments disclosed herein relate to systems and methods for an autonomous vehicle. The vehicle can be, for example, any of several types of autonomous vehicle (e.g., a car, truck, aircraft, drone, watercraft, etc.).

In one embodiment, a method for an autonomous vehicle includes receiving first object data from a first sensor module and receiving second object data from a second sensor module. The first object data and the second object data are compared. For example, the comparison can be performed by a processor (e.g., CPU, GPU, or FPGA). Based on comparing the first object data to the second object data, a determination is made whether the first object data corresponds to the second object data. For example, this determination can be based on comparing a statistical correlation to a threshold (e.g., whether a correlation within one or more predetermined limits). In response to determining that the first object data does not correspond to the second object data (e.g., due to a failure of sensor components or sensor fusion processing), an action is performed for the autonomous vehicle. For example, the action can be a change in control of an operational characteristic of the vehicle such as a change in navigation or engine control.

In some embodiments, the operation or configuration of the vehicle is controlled based on a determination of a sensor and/or sensor fusion failure. For example, one or more systems of the vehicle can be controlled by a host system. Data regarding operation of the vehicle can be collected by a memory device. The collected data is generated by the one or more systems. After being collected, the data is stored in the memory device.

In one embodiment, the autonomous vehicle includes sensors that collect sensor data. A non-volatile memory device of the vehicle is used to receive various data to be stored (e.g., raw sensor data and/or results from processing of raw sensor data, such as data regarding a type or position of a detected object). One or more computing devices can control the operation of the vehicle. At least one of these computing devices is used to control collection, by the non-volatile memory device, of data generated by the vehicle during operation. This data can include the sensor data. The computing device is, for example, a controller of the memory device, and the controller executes instructions in firmware of the memory device. After collecting the data, the memory device stores the data (e.g., using non-volatile memory such as 3DXP memory).

FIG. 1 illustrates an autonomous vehicle 610 including sensor modules 612, 614 that provide data to a central processing device 618, according to one embodiment. Each sensor module 612, 614 provides object data to central processing device 618. One or more other sensors 616 provide sensor data to central processing device 618. In one embodiment, sensors 616 provide raw sensor data and/or object data.

Central processing device 618 compares the object data received from each of the sensor modules 612, 614. In one example, the comparison is based on detection of a single object in the field of view of sensor module 612 and sensor module 614. In one example, the comparison is based on a correlation determined based on several events, each event related to detection of a different object. Central processing device 618 uses the comparison of the object data to determine whether the object data from sensor module 612 corresponds to object data from sensor module 614.

If the object data matches, then central processing device 618 determines that system operation is reliable and that each sensor module 612, 614 is functioning properly. If the object data does not match, central processing device 618 determines that a system failure exists. For example, the failure may exist in either or both of sensor module 612 and 614.

In one example, object data from sensor modules 612, 614 is determined to match if the data satisfies a statistical correlation. In one example, a correlation is determined and compared to a predetermined limit or threshold.

In response to determining that the object data from each sensor module 612, 614 does not match, central processing device 618 sends a signal to a host processing device 620. The signal indicates that a failure has been identified.

In one embodiment, host processing device 620 performs one or more actions in response to receiving the signal indicating identification of a failure. In various embodiments, host processing device 620 sends control signals to one or more vehicle systems 622 that change the operation of one or more aspects of the autonomous vehicle 610. In one example, navigation, braking control, and/or engine control are changed. In another example, a configuration for one or more vehicle systems 622 is updated. In one example, firmware for one of the vehicle systems 622 is updated. In one example, at least a portion of the firmware is downloaded from a central server using wireless communications.

In one embodiment, the action performed by host processing device 620 is initiating performance of one or more diagnostic tests. For example, a diagnostic test of sensor module 612 and/or 614 can be performed. In another example, alternatively and/or additionally, a diagnostic test of central processing device 618 can be performed.

In one embodiment, sensors 616 provide data to central processing device 618 that is used to determine a context of operation of autonomous vehicle 610. For example, sensor 616 may provide data indicating whether the vehicle is currently operating in daytime or nighttime. This provides contextual data that central processing device 618 can use in making a comparison of object data from sensor modules 612, 614.

In one example, central processing device 618 is a system-on-chip (SOC), field programmable gate array (FPGA), CPU, or graphics processing unit (GPU). In one example, central processing device 618 stores run-time data in a volatile memory device(s) (e.g., a DRAM device). In one example, central processing device 618 can include logic circuitry implementing at least a portion of various embodiments described herein.

In one example, host processing device 620 is a system-on-chip (SOC), field programmable gate array (FPGA), CPU, or graphics processing unit (GPU). In one example, host processing device 620 stores data in a volatile memory device(s). For example, the data stored is received from vehicle systems 622. The host processing device 620 can be, for example, a processing core of a processor, an execution unit, etc.

In one example, the central processing device 618 and/or host processing device 620 can include hardware such as one or more integrated circuits and/or discrete components, a buffer memory, a cache memory, or a combination thereof. The host or central processing device can be a microcontroller, special purpose logic circuitry (e.g., a field programmable gate array (FPGA), an application specific integrated circuit (ASIC), etc.), or another suitable processor.

In one example, each sensor module 612, 614 is a camera. Each camera shares a common field of view. It is expected during normal operation that the cameras will detect the same object most of the time. If the object data fails to match when compared to a predetermined threshold, it is determined that there is a system failure. In one example, the compared object data is expected to exceed a threshold percentage (e.g., 60%) if the system is operating properly. In one example, the threshold percentage is 99% for events that occur during daytime, and 70% for events that occur during nighttime.

Figure 2:
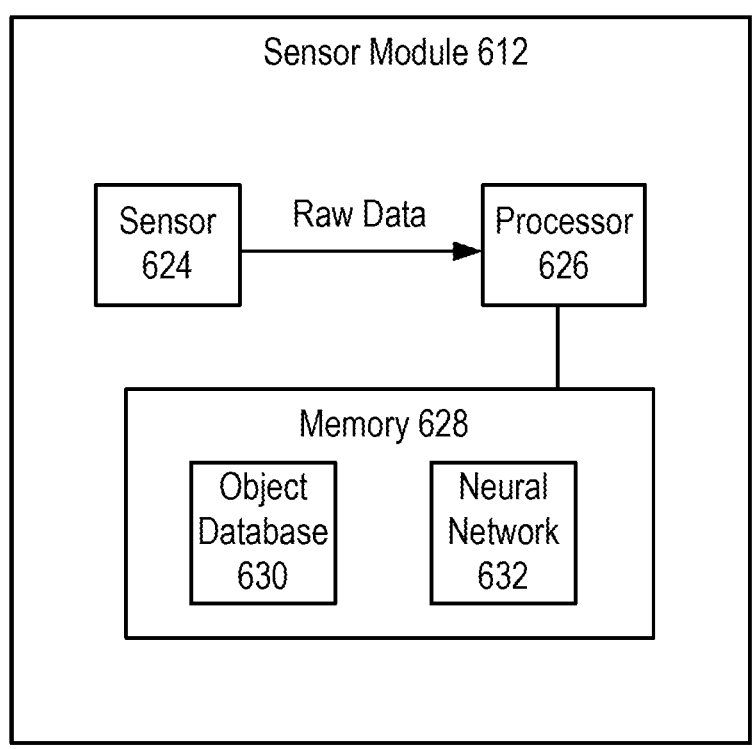
FIG. 2 illustrates a sensor module including a sensor that provides raw data to a processor, according to one embodiment.

FIG. 2 illustrates a sensor module 612 including a sensor 624 that provides raw data to a processor 626, according to one embodiment. In one example, sensor module 614 is the same as or similar to sensor module 612. In another example, sensor 616 is similar to sensor module 612. In one example, sensor 624 is a camera. In another example, sensor 624 is a radar or lidar sensor. Processor 626 is, for example, a microprocessor, a GPU, and/or an FPGA.

Processor 626 executes one or more processes to evaluate the raw data from sensor 624. Processor 626 provides object data as a result from this processing. The object data is transmitted to a central processing device. The object data includes, for example, position data and/or object type data. Other metadata characterizing the detected object may also be included.

Processor 626 accesses memory 628 during operation. Memory 628 is, for example, volatile memory and/or non-volatile memory.

Memory 628 includes an object database 630. Database 630 includes a library of object types. Processor 626 can retrieve a predetermined object type from the library when providing a result from evaluating raw data from sensor 624.

In one embodiment, neural network 632 is stored in memory 628. Neural network 632 can be used to provide one or more inputs to processor 626 when it is evaluating raw data from sensor 624. In one embodiment, neural network 632 receives inputs from sensors 616 that are used for determining a context of operation for autonomous vehicle 610 as an output from the neural network 632. The output is provided to processor 626 for use in evaluating raw data from sensor 624.

Figure 3:
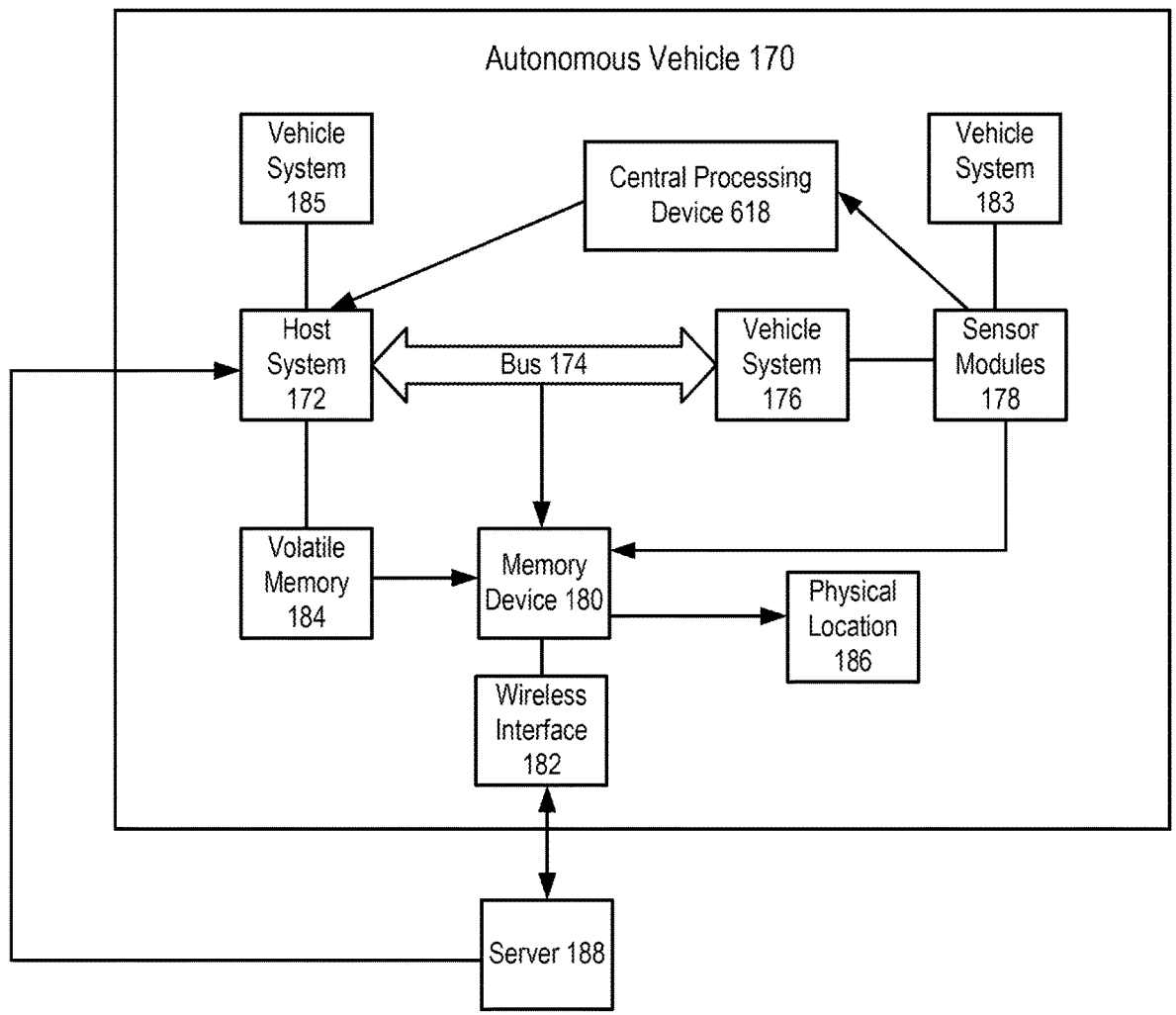
FIG. 3 illustrates an autonomous vehicle including a central processing device that receives data from sensor modules, according to one embodiment.

FIG. 3 illustrates an autonomous vehicle 170 including central processing device 618 to receive data from sensor modules 178, according to one embodiment. Sensor modules 178 are an example of sensor modules 612, 614.

In one embodiment, central processing device 618 receives object data from sensor modules 178. Based on a comparison of the object data, central processing device 618 sends a signal to host system 172 indicating that a system failure has been detected. Host system 172 is an example of host processing device 620. In response to receiving the signal indicating the system failure, host system 172 sends a signal to vehicle system 176 over bus 174 that causes vehicle system 176 to change an operational aspect of autonomous vehicle 170. In another embodiment, host system 172 can change an operation and/or update a configuration of vehicle system 185. In another embodiment, data for updating software and/or a configuration of the vehicle system 185, host system 172, and/or vehicle system 176 is downloaded from server 188 using wireless interface 182 and stored in memory device 180.

Data is generated by various systems of the vehicle 170 including, for example, vehicle systems 176, 183, 185. For example, one or more of sensor modules 178 are used by vehicle system 176 and 183. Each system may perform processing on sensor data and then transmit the resulting data (e.g., object data) to another component of the vehicle and/or may pass through raw sensor data to another component.

In one example, data from vehicle system 176 is sent to a host system 172 over a communications bus 174. The host system 172 controls various operations of the vehicle system 176 (e.g., an image processing and recognition system). Host system 172 sends commands over bus 174 to vehicle system 176. For example, a command can be used to control engine operation or to implement steering control.

Host system 172 also can control other systems such as vehicle systems 183 and/or vehicle system 185. Host system 172 can receive replies and/or data from these systems over one or more communication paths of the vehicle 170 (e.g., bus 174).

In one embodiment, memory device 180 monitors communications on bus 174. Memory device 180 can collect selected data from bus 174. In one example, memory device 180 listens for certain predetermined types of data for extraction from bus 174. The extracted data is stored by memory device 180.

In one embodiment, memory device 180 stores collected data in a predetermined physical location 186. Physical location 186 may correspond to a physical position or location of the vehicle 170. In other cases, physical location 186 may correspond to a particular predetermined component or a type of component (e.g., a particular type of memory storage media).

In one embodiment, memory device 180 collects data stored in a volatile memory 184. In one example, volatile memory 184 is used by host system 172. For example, host system 172 can collect data from various systems of vehicle 170. This data can be stored in volatile memory 184. In one embodiment, memory device 180 collects data from the sensor modules 178.

In one embodiment, after data has been collected by memory device 180, the data is stored in memory device 180. The stored data can be transmitted at a later time to a server 188 over a wireless interface 182.

In one embodiment, server 188 analyzes the collected data received from memory device 180. Based on this analysis, one or more configurations of vehicle 170 can be implemented or updated. For example, server 188 can send a command to memory device 180 via wireless interface 182 regarding a change in configuration to implement in vehicle 170. Memory device 180 can control the implementation of the configuration change.

In another embodiment, based on analysis of the collected data, server 188 sends a communication to host system 172. In one example, this communication can be sent via a wireless interface (not shown). The communication can be, for example, a command to update a configuration of vehicle 170. This update can be implemented under control of host system 172. In one embodiment, the update is performed in response to a determination of system failure by central processing device 618.

In one embodiment, the collected data is stored in a non-volatile memory device (e.g., memory device 180). After storing, the data is removed from the non-volatile memory device and, for example, analyzed by a server (e.g., a server in the cloud) (e.g., server 188).

In one embodiment, analysis of stored data is used to identify unsafe aspects or design of the software that operates the vehicle (e.g., software that executes on host system 172 to control navigation). In response to this analysis, control and/or configuration actions can be performed for the vehicle (e.g., via wireless interface 182). In some cases, the same or similar control and/or configuration can be performed for other vehicles (e.g., vehicles of the same type and/or using the same or similar software). In various embodiments, the vehicle can be, for example, any of several types of autonomous vehicle (e.g., a car, truck, aircraft, drone, watercraft, etc.).

In various embodiments, the collected data can be stored by any of several non-volatile memory systems of the vehicle (e.g., at physical location 186). An example of a memory system is a storage system, such as a solid-state drive (SSD). In some embodiments, the memory system is a hybrid memory/storage system. In general, a vehicle can utilize a memory system that includes one or more memory devices. The memory devices can include media. The media can be non-volatile memory devices, such as, for example, negative-and (NAND).

In one embodiment, a cloud service (sometimes referred to as simply the cloud) is used to receive the collected data from the vehicle and then to analyze the data. For example, when the automatic emergency braking system of a vehicle is activated, event data (e.g., the location) of that braking event is transmitted to, for example, a server or other computing device in the cloud service.

In one embodiment, event data collected by memory device 180 is received from a vehicle and analyzed. For example, pattern recognition can be used on the received event data. In one case, machine learning is used to recognize patterns or regularities in data. In some cases, a pattern recognition system can be trained from labeled training data (e.g., supervised learning). In other cases, when no labeled data is available, other algorithms can be used to identify previously unknown patterns (e.g., unsupervised learning).

In one embodiment, an event occurring on the vehicle is detected based on a measurement of a brake pedal in a vehicle. For example, the event may be identified based on a foot pressure or extent of movement as compared to a predetermined threshold. In another embodiment, an event is identified based on a rate of deceleration of the vehicle. For example, if a rate of deceleration exceeds a predetermined threshold, then an event (e.g., a near collision) is identified. In another example, the rate of deceleration is observed over a predetermined time period (e.g., the rate is averaged over the time period). In response to detecting this event, system memory data is downloaded. The detection of such events can trigger collection of data by memory device 180.

In one embodiment, in response to analyzing event data, at least one action is performed. For example, a communication can be sent to vehicle 170 (e.g., from which the collected data is obtained) to configure software of the vehicle and/or disable one or more functions of the vehicle or software.

In one embodiment, in response identifying unsafe software (e.g., as determined based on pattern recognition or other analysis of collected data, such as object data from sensor modules 178), a server can perform one or more actions. For example, the server can send a communication to the current vehicle. In one case, the communication can cause the current vehicle to take corrective actions, such as terminating an autonomous navigation mode, braking, or changing course, or updating firmware of the vehicle (e.g., via an over-the-air firmware update).

In one embodiment, in response to receiving a communication from a server that has analyzed data collected by memory device 180, vehicle 170 can switch off its autonomous driving mode, use a backup system, and/or activate a braking system to stop the vehicle.

In another embodiment, the cloud service can send a communication to a server or other computing device that monitors an operating status for other vehicles (e.g., a central monitoring service). The communication can, for example, identify that a software component(s) is unsafe.

In one embodiment, the determination whether a vehicle has experienced a braking event and/or been involved in an accident can be based on data from one or more sensors or sensor modules of the vehicle. For example, data from an accelerometer of the vehicle can indicate a rapid deceleration of the vehicle (e.g., deceleration exceeding a threshold). In another case, data can indicate that an emergency system of the vehicle has been activated, such as for example, an airbag, an emergency braking system, etc. In some embodiments, any one and/or a combination of the foregoing events can be deemed to be an event for which downloaded data is transmitted to a server. Data associated with the foregoing events can be collected by memory device 180.

In one embodiment, one or more sensor modules (e.g., sensor modules 178) on the current vehicle are used to obtain data regarding braking events and/or objects in the environment of the vehicle as it travels. Object data from the sensor modules and/or data generated based on analysis of other sensor data and/or other types of data can be, for example, transmitted to the cloud service wirelessly (e.g., using a 3G, 4G, or 5G network or other radio-based communication system) after being collected automatically by memory device 180.

In one embodiment, in response to identifying unsafe software determined based on collected data, one or more actions of a vehicle are configured. For example, an over-the-air firmware update can be sent to the vehicle for updating firmware of a computing device of the vehicle (e.g., this update causes the vehicle to avoid identified unsafe functions). In one example, the firmware updates a navigation system of the vehicle.

Figure 4:
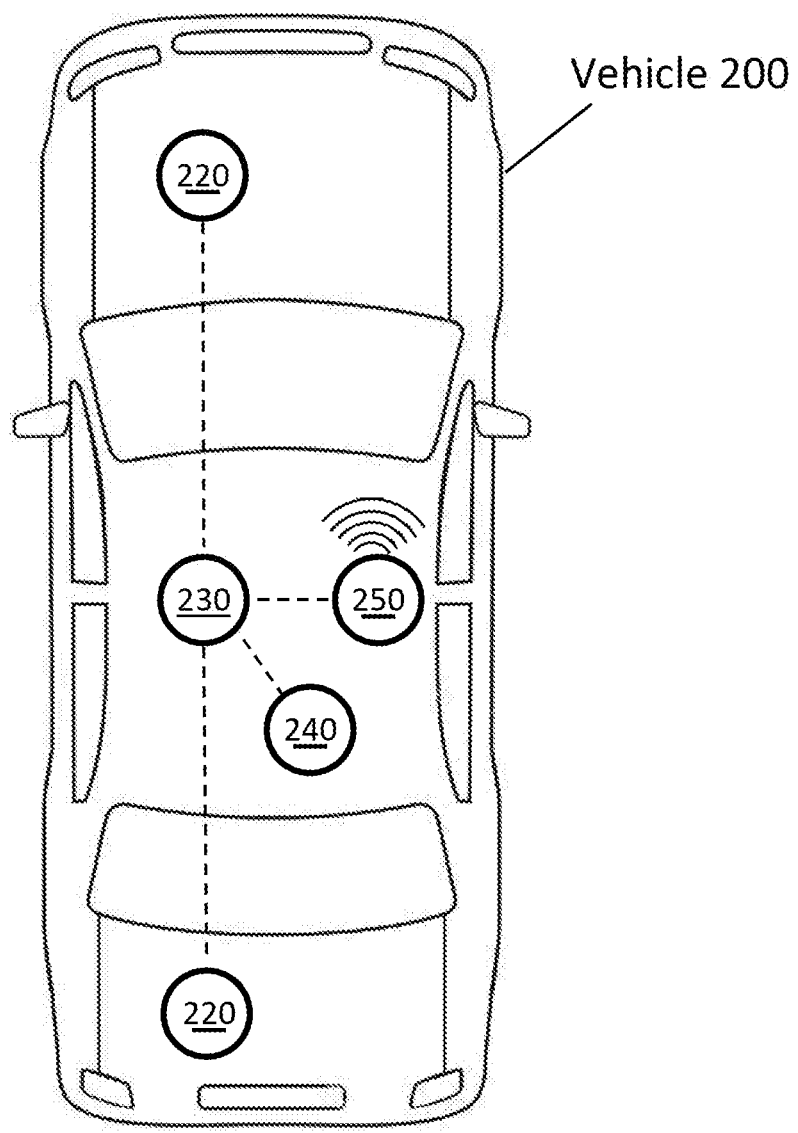
FIG. 4 illustrates a vehicle that collects data during operation, according to one embodiment.

FIG. 4 illustrates a vehicle 200 that collects data during operation, according to one embodiment. Vehicle 200 is an example of autonomous vehicle 610.

For example, autonomous vehicle 200 detects various objects during travel. Vehicle 200 also detects certain events that trigger downloading data (e.g., from system memory) to a non-volatile memory device. In one example, vehicle 200 detects the event that a collision with an object (e.g., another vehicle) has occurred. In response to detecting the collision, a computing system of vehicle 200 causes system memory data to be downloaded to a non-volatile memory device. This is done to permit analysis of the downloaded data after the collision. In one example, any of the foregoing data can be collected automatically by memory device 180.

More particularly, in one embodiment, FIG. 4 illustrates a sensing system located on board vehicle 200 for collecting information concerning operation of the vehicle. Any of this collected data can be, for example, a portion of the data downloaded from system memory and/or from other volatile memory in response to detecting an event, or routinely collected during normal operation of the vehicle.

For example, the sensing system can be used to collect object and event data for sending to a cloud service to be stored for analysis. The object data can also be sent to a central processing device to be compared to other object data, as described above.

The sensing system, in various embodiments, may generally include one or more sensor modules 220, a processor 230, memory 240, and a communication device (e.g., transmitter 250). Other data in addition to object data can be collected for sending to the cloud service.

The sensing system, in various embodiments, may include one or more sensor modules 220 (sometimes referred to herein as simply sensors 220) configured to collect information regarding operational aspects of autonomous vehicle 200, such as speed, vehicle speed, vehicle acceleration, braking force, braking deceleration, and the like. Representative sensors configured to collect information concerning operational driving characteristics may include, without limitation, tachometers like vehicle speed sensors or wheel speed sensor, brake pressure sensors, fuel flow sensors, steering angle sensors, and the like.

The sensing system, in various embodiments, may additionally or alternatively include one or more sensors 220 configured to collect information regarding the static environment in which autonomous vehicle 200 is operated, such as the presence and content of physical objects surrounding the vehicle. The physical objects include, for example, signage and traffic signals (e.g., stop signs, construction zones, speed limit signs, stop lights), road lane dividers (e.g., solid and dashed lane lines), and the like. Representative sensors configured to collect such static operating environment information may include outward-facing cameras positioned and oriented such that their respective fields of view can capture the respective information each is configured to collect. For example, a camera configured to capture surrounding signage may be configured towards the front of or on top of autonomous vehicle 200 and oriented forward-facing (e.g., straight ahead or perhaps canted sideways by up to about 45 degrees) so as to capture roadside and overhead signage/traffic signals within its field of view as autonomous vehicle 200 travels forward.

As another example, cameras configured to capture road lane dividers may be positioned on the side of or off a front/rear quarter of autonomous vehicle 200 and may be oriented somewhat downwards so as to capture road lane dividers on both sides of vehicle autonomous 200. Additional representative sensors for collecting static operating environment information may include receivers configured to receive wireless signals from base stations or other transmitters communicating information that may ordinarily be found on signage or otherwise related to the static operating environment of autonomous vehicle 200. Likewise, global positioning system (GPS) or other location-related sensors may be utilized to collect information regarding the static environment in which vehicle 200 is operated, such as what street autonomous vehicle 200 is driving on, whether that street is a traffic artery (e.g., highway) or other type, and whether that location is in an urban or rural area.

The sensing system, in various embodiments, may additionally or alternatively include one or more sensors 220 configured to collect information regarding the dynamic environment in which autonomous vehicle 200 is operated, such as information concerning the presence of moving objects such as, for example, other nearby vehicles (e.g., along with such vehicle's location, direction of travel, rate of speed, and rate of acceleration/deceleration), as well as similar information concerning the presence of nearby pedestrians. In one embodiment, any of the foregoing information can be used during evaluation by a sensor module 612, 614 to generate object data.

Representative sensors configured to collect such dynamic operating environment information may include outward-facing cameras positioned and oriented such that their respective fields of view can capture the respective information each is configured to collect. For example, outward-facing cameras may be positioned about the perimeter of autonomous vehicle 200 (e.g., on the front, rear, top, sides, and/or quarters) to capture imagery to which image processing techniques such as vehicle recognition algorithms may be applied. Additionally or alternatively, one or more optical sensors (e.g., lidar, infrared), sonic sensors (e.g., sonar, ultrasonic), or similar detection sensors may be positioned about the vehicle for measuring dynamic operating environment information such as distance, relative velocity, relative acceleration, and similar characteristics of the motion of nearby piloted or autonomous vehicles.

The sensing system, in various embodiments, may leverage as sensor(s) 220 those sensors typically found in most autonomous vehicles such as, without limitation, those configured for measuring speed, RPMs, fuel consumption rate, and other characteristics of the vehicle's operation, as well as those configured for detecting the presence of other vehicles or obstacles proximate the vehicle. Sensors 220 may additionally or alternatively comprise aftermarket sensors installed on autonomous vehicle 200 for facilitating the collection of additional information related to driving style.

The sensing system of vehicle 200, in various embodiments, may further comprise an onboard processor 230, onboard memory 240, and an onboard transmitter 250. Generally speaking, in various embodiments, processor 230 may be configured to execute instructions stored on memory 240 for processing information collected by sensor(s) 200 for subsequent transmission offboard vehicle 200. Onboard processor 230, in various embodiments, may additionally or alternatively be configured to execute instructions stored on memory 240 for processing information from two or more sensors 220 to produce further information concerning object characteristics detected by autonomous vehicle 200. For example, in an embodiment, processor 230 may process operational characteristics, such as braking deceleration, alongside dynamic environment characteristics, such as following distance, to avoid debris or an animal suddenly appearing in the roadway. It should be recognized that this is merely an illustrative example, and that one of ordinary skill in the art will recognize further ways sensor data may be processed by a processor to produce further information concerning objects detected by autonomous vehicle 200.

Processor 230, in various embodiments, may be configured to pre-process information from sensor(s) 220 for subsequent offboard transmission via transmitter 250. Pre-processing activities may include one or a combination of filtering, organizing, and packaging the information from sensors 220 into formats and communications protocols for efficient wireless transmission. In such embodiments, the pre-processed information may then be transmitted offboard vehicle 200 by transmitter 250 in real-time or at periodic intervals, where it may be received by nearby piloted or autonomous vehicles and/or a remote server. It should be appreciated that transmitter 250 may utilize short-range wireless signals (e.g., Wi-Fi, BlueTooth) when configured to transmit the pre-processed information directly to nearby piloted or autonomous vehicles, and that transmitter 250 may utilize longer-range signals (e.g., cellular, satellite) when transmitting the pre-processed information directly to the remote server, according to various embodiments later described.

In one embodiment, processor 230 can be a processor of a memory device (e.g., memory device 180) that operates independently of a host system to automatically collect data from vehicle 200.

Like sensor(s) 220, in various embodiments, processor 230 and/or onboard transmitter 250 may be integrally installed in vehicle 200 (e.g., car computer, connected vehicles), while in other embodiments, processor 230 and/or transmitter 250 may be added as an aftermarket feature.

Figure 5:
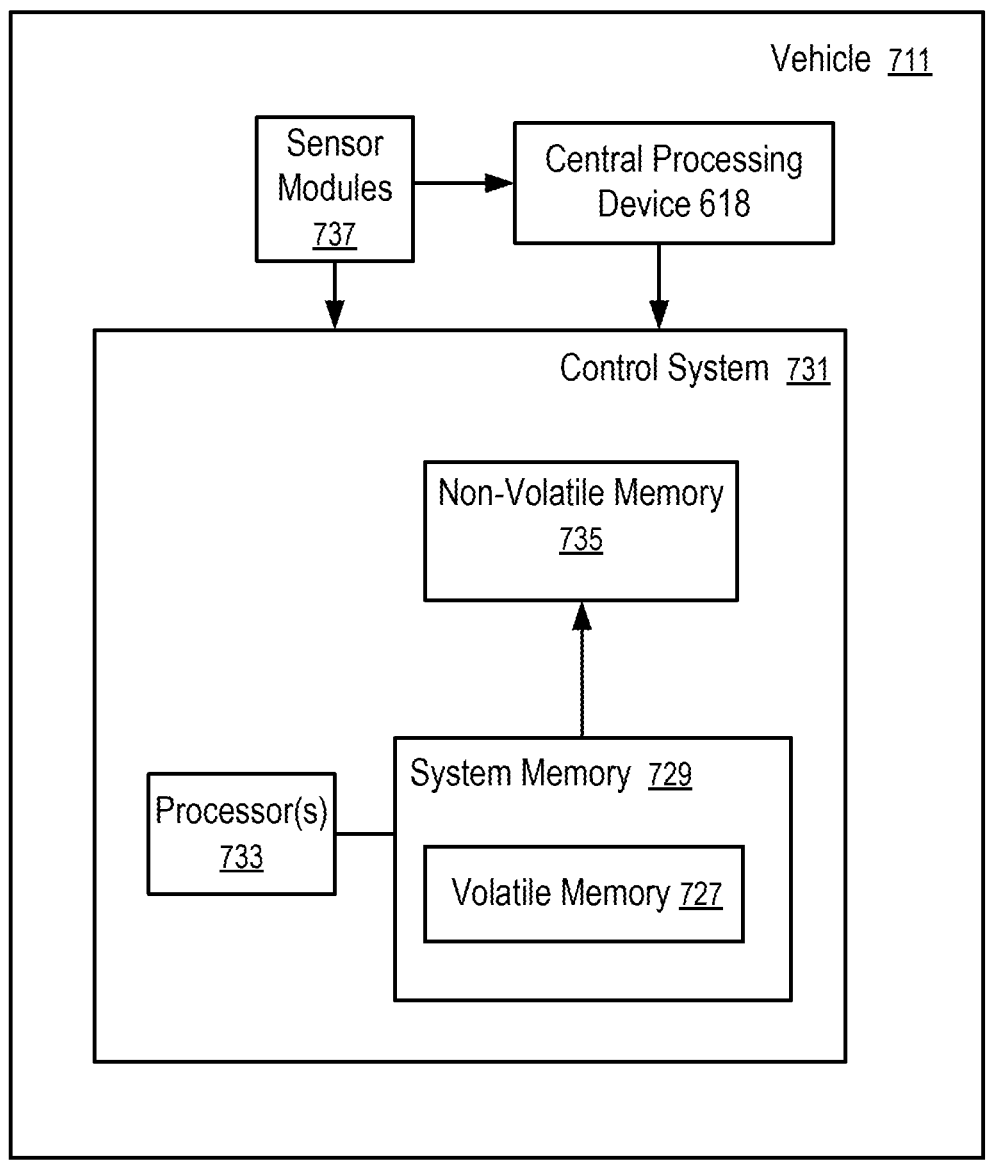
FIG. 5 illustrates a vehicle including sensor modules that provide data to a central processing device and a control system, according to one embodiment.

FIG. 5 illustrates a vehicle including sensor modules 737 that provide data to central processing device 618 and a control system 731, according to one embodiment. Sensor modules 737 are an example of sensor modules 612, 614.

In one embodiment, control system 731 is used to download data in response to detecting an event associated with a vehicle 711, according to one embodiment. In one example, the detected event is a system failure determined based on a signal received from central processing device 618. In one example, central processing device 618 receives object data from each of sensor modules 737.

In one example, the control system 731 is included in memory device 180 of FIG. 3, and the downloaded data is collected by memory device 180.

Control system 731 also controls at least one operation (e.g. navigation and/or braking) of the vehicle. The control system 731 includes one or more processors 733, non-volatile memory 735, and system memory 729, which includes volatile memory 727. System memory 729 may also include, for example, data of vehicle 711 stored in other volatile memory devices (not shown).

The volatile memory 727 may be, for example, a dynamic random access memory device. Volatile memory 727 is used to store data used by software during operation of the vehicle such as sensor data (e.g., object data) and data regarding the operational state of the control system 731. The object data is collected, for example, by sensor modules 737.

Non-volatile memory 735 is used to store data from the volatile memory 727 after an event is detected. Examples of non-volatile memory 735 include 3D XPoint memory and NAND flash memory, as well as removable memory devices such as solid state disks.

The vehicle 711 uses sensor modules 737 and control system 731 to detect various events, as mentioned above. These events can include, for example, the collision of vehicle 711 with an object. Other events may be detection of a system activity such as emergency braking system activation or sensor data exceeding a threshold. When an event is detected, data stored in volatile memory 727 is downloaded to non-volatile memory 735. Examples of the stored data includes sensor data such as data regarding acceleration, vehicle speed and braking status, lidar and video input, location data and control system status such as a program counter indicating operational state of the software executing during the event. In some embodiments, after an event is detected by control system 731, downloading of volatile data to non-volatile data is performed within a specific time duration (e.g. less than five to ten seconds).

In one embodiment, the control system 731 of vehicle 711 may be configured to extract event data from the non-volatile memory and analyze that data. The event data is extracted after being downloaded following detection of an event. For example, the event data can be transmitted wirelessly to a central server that monitors the travel and operation of vehicle 711.

In one embodiment, only a predetermined portion of system memory 729 is downloaded. Processor 733 can determine after detection of an event the predetermined portion to be downloaded. In another embodiment, data from system memory 729 can be downloaded portion by portion in an order based on priority of data. The priority may be determined by a type of event detected by control system 731.

Figure 6:
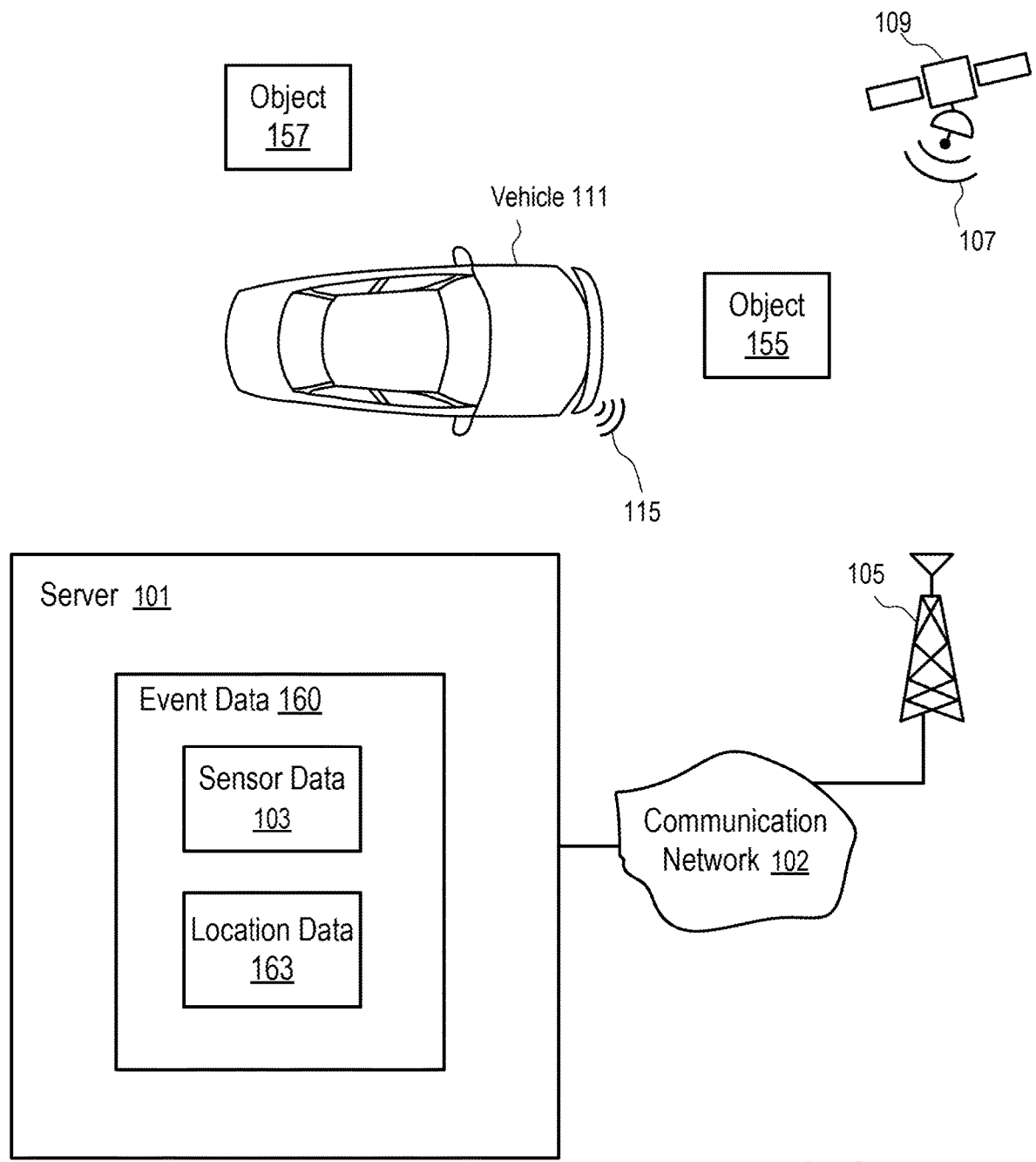
FIG. 6 illustrates a server that stores event data received from a vehicle, according to one embodiment.

FIG. 6 illustrates a server 101 that stores event data received from a vehicle, according to one embodiment. In one example, the event data corresponds to a determination by a central processing device that object data from sensor modules of vehicle 111 do not match. For example, vehicle 111 may detect object 155 using sensor modules that send object data to the central processing device.

In one example, if a sensing system failure for vehicle 111 is detected, event data 160 (e.g., stored in volatile memory 727 of FIG. 5) is downloaded from system memory 729 to non-volatile memory 735. Event data 160 can include data such as sensor data 103 (obtained from sensor modules of vehicle 111), location data 163, data related to activation of an emergency braking system, or data output from an artificial neural network. During operation, vehicle 111 collects data regarding objects that are detected such as object 155 and object 157.

The event data 160 is extracted from the non-volatile memory and communicated through a wireless communication network 102 to a server 101. Server 101 analyzes the event data 160 to determine a cause of sensing failure (e.g., software failure). For example, server 101 can use emulation to determine whether software executing on the vehicle 111 functioned properly. Server 101 can select the type of event data 160 (e.g. sensor data or control system status) to be downloaded for analysis. One example of wireless communication network 102 is a cell phone network.

The collected event data received from the vehicle 111 by server 101 is analyzed. For example, this analysis can include pattern recognition or other data analysis (e.g., determining a correlation of event data to other data).

In response to identifying a failure of software, at least one action is performed. For example, server 101 can transmit a communication to vehicle 111 that causes the vehicle to re-configure software.

In one example, a vehicle may communicate, via a wireless connection 115 to an access point (or base station) 105, with the server 101 to submit event data. The wireless connection 115 may be made via a wireless local area network, a cellular communications network, and/or a communication link 107 to a satellite 109 or a communication balloon.

Optionally, the vehicle 111 has a self-learning capability. After an extended period on the road, the vehicle 111 may have its software re-configured. In one example, the centralized server 101 may be operated by a factory, a producer or maker of the vehicle 111 or a vendor of the autonomous driving and/or advanced driver assistance system for vehicle 111.

Figure 7:
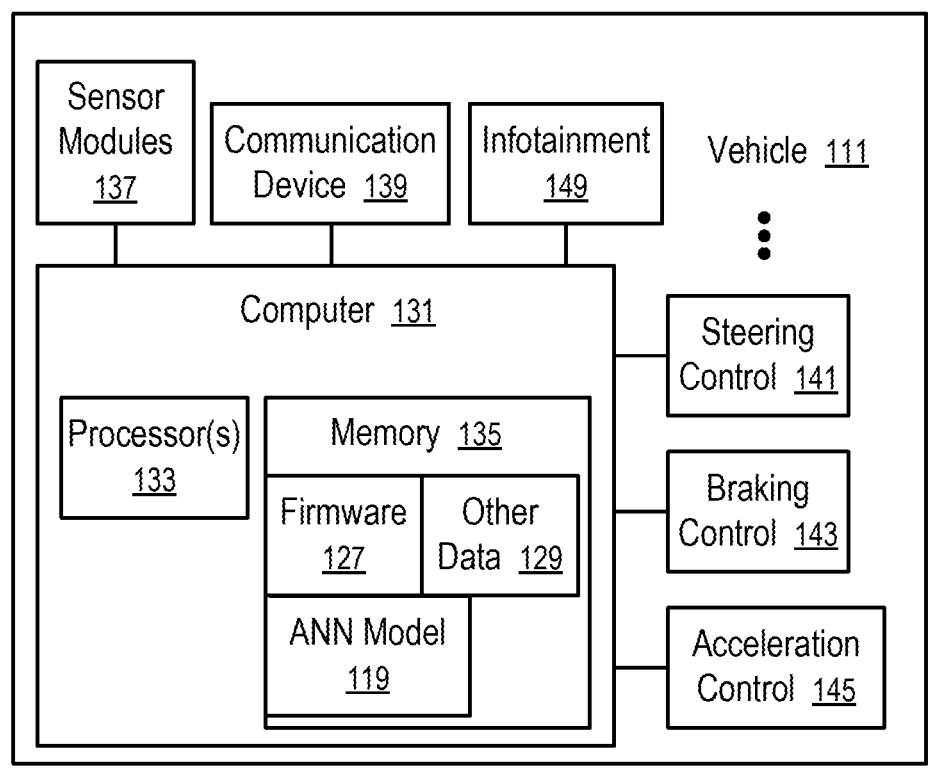
FIG. 7 illustrates an example of a vehicle including sensor modules and configured using an Artificial Neural Network (ANN) model, according to one embodiment.

FIG. 7 illustrates an example of vehicle 111 including sensor modules 137 and configured using an Artificial Neural Network (ANN) model, according to one embodiment. Sensor modules 137 provide object data to computer 131. Computer 131 includes a processor and/or a software process that performs the role of a central processing device.

The vehicle 111 includes an infotainment system 149, a communication device 139, one or more sensors 137, and a computer 131 that is connected to some controls of the vehicle 111, such as a steering control 141 for the direction of the vehicle 111, a braking control 143 for stopping of the vehicle 111, an acceleration control 145 for the speed of the vehicle 111, etc.

The computer 131 of the vehicle 111 includes one or more processors 133, memory 135 storing firmware (or software) 127, the ANN model 119, and other data 129.

In one example, firmware 127 is updated by an over-the-air update in response to a communication from server 101 sent in response to identifying faulty software. Alternatively, and/or additionally, other firmware of various computing devices or systems of vehicle 111 can be updated.

The one or more sensors 137 may include a visible light camera, an infrared camera, a lidar, radar, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an event or object captured in the sensor input, such as an image or video clip. Data from this identification and/or classification can be included in data collected by a memory device (e.g., memory device 180) and sent from a vehicle to server 101 as discussed above.

Alternatively, and/or additionally, the identification of unsafe software can be used by an autonomous driving module of the firmware (or software) 127 to generate a response. The response may be a command to activate and/or adjust one of the vehicle controls 141, 143, and 145. In one embodiment, the response is an action performed by the vehicle where the action has been configured based on an update command from server 101 (e.g., the update command can be generated by server 101 in response to determining that software of vehicle 111 is faulty based on analysis of event data). In one embodiment, prior to generating the control response, the vehicle is configured. In one embodiment, the configuration of the vehicle is performed by updating firmware of vehicle 111. In one embodiment, the configuration of the vehicle includes updating of the computer model stored in vehicle 111 (e.g., ANN model 119).

In one embodiment, the server 101 stores received sensor input as part of sensor data for the subsequent further training or updating of the ANN model 119 using the supervised training module 117. When an updated version of the ANN model 119 is available in the server 101, the vehicle 111 may use the communication device 139 to download the updated ANN model 119 for installation in the memory 135 and/or for the replacement of the previously installed ANN model 119. These actions may be performed in response to determining that vehicle 111 is failing to properly detect objects and/or in response to identifying unsafe software.

In one example, the outputs of the ANN model 119 can be used to control (e.g., 141, 143, 145) the acceleration of a vehicle (e.g., 111), the speed of the vehicle 111, and/or the direction of the vehicle 111, during autonomous driving.

In one example, data obtained from a sensor of a vehicle may be an image that captures an object using a camera that images using lights visible to human eyes, or a camera that images using infrared lights, or a sonar, radar, or lidar system. In one embodiment, image data obtained from at least one sensor of the vehicle is part of the collected data from the vehicle that is analyzed. In some instances, the ANN model is configured for a particular vehicle based on the sensor and other collected data.

Figure 8:
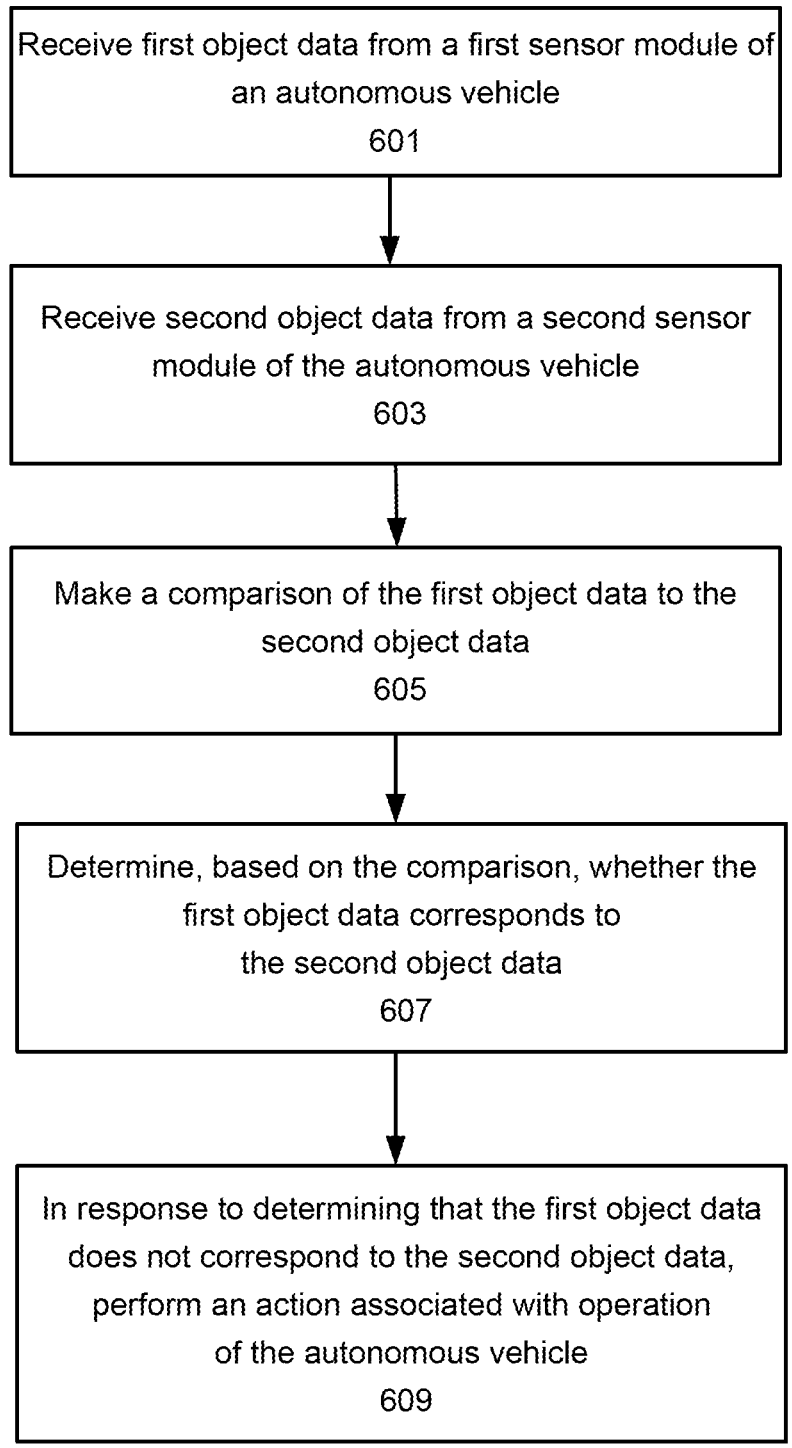
FIG. 8 shows a method to determine whether object data from a first sensor module corresponds to object data from a second sensor module, according to one embodiment.

FIG. 8 shows a method to determine whether object data from a first sensor module corresponds to object data from a second sensor module, according to one embodiment. For example, the first sensor module is sensor module 612 and the second sensor module is sensor module 614. For example, the method of FIG. 8 can be implemented in the system of FIGS. 1-7.

The method of FIG. 8 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 8 is performed at least in part by central processing device 618.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In block 601, first object data is received from a first sensor module of an autonomous vehicle. For example, object data regarding a position and/or a type of object is received by central processing device 618 from sensor module 612.

In block 603, second object data is received from a second sensor module of the autonomous vehicle. For example, object data regarding a position and/or a type of object is received by central processing device 618 from sensor module 614.

In block 605, a comparison is made of the first object data to the second object data. For example, central processing device 618 compares object data from sensor modules 612, 614 based on a statistical correlation.

In block 607, based on this comparison of the object data, a determination is made whether the first object data corresponds to the second object data. For example, central processing device 618 compares the statistical correlation to a predetermined threshold or limit to determine whether object data from sensor module 612 corresponds to (e.g., matches) object data from sensor module 614.

In block 609, in response to determining that the first object data does not correspond to the second object data, an action is performed associated with operation of the autonomous vehicle. For example, central processing device 618 sends a signal to host processing device 620 to cause a change in operation of one or more vehicle systems 622.

In one embodiment, a method for an autonomous vehicle (e.g., autonomous vehicle 610) includes: receiving first object data from a first sensor module (e.g., sensor module 612); receiving second object data from a second sensor module (e.g., sensor module 614); comparing the first object data to the second object data; determining, based on comparing the first object data to the second object data, whether the first object data corresponds to the second object data; and in response to determining that the first object data does not correspond to the second object data, performing an action for the autonomous vehicle.

In one embodiment, the first sensor module comprises a processing device configured to process raw data from a sensor.

In one embodiment, the first object data comprises a position and object type for an object detected by the first sensor module, and the second object data comprises a position and object type for an object detected by the second sensor module.

In one embodiment, comparing the first object data to the second object data comprises determining a correlation of the first object data to the second object data.

In one embodiment, a non-transitory computer storage medium stores instructions which, when executed on a computing device (e.g., central processing device 618), cause the computing device to perform a method for an autonomous vehicle, the method comprising: receiving first object data from a first sensor module; receiving second object data from a second sensor module; comparing the first object data to the second object data; determining, based on comparing the first object data to the second object data, whether the first object data corresponds to the second object data; and in response to determining that the first object data does not correspond to the second object data, performing an action associated with the autonomous vehicle.

In one embodiment, a processing device controls navigation of the autonomous vehicle, and performing the action comprises causing the processing device to change a path of navigation for the autonomous vehicle.

In one embodiment, an autonomous vehicle comprises: a first sensor module comprising a first sensor (e.g., sensor 624) and a first processing device (e.g., processor 626), wherein the first processing device evaluates sensor data (e.g., raw data in FIG. 2) from the first sensor to provide first object data; a second sensor module comprising a second sensor and a second processing device, wherein the second processing device evaluates sensor data from the second sensor to provide second object data; a central processing device configured to receive object data provided by sensor modules of the autonomous vehicle; and memory storing instructions configured to instruct the central processing device to: receive the first object data; receive the second object data; make a comparison of the first object data to the second object data; determine, based on the comparison, whether the first object data corresponds to the second object data; and in response to determining that the first object data does not correspond to the second object data, perform an action associated with operation of the autonomous vehicle.

In one embodiment, the first object data includes a type of object selected from a plurality of object types.

In one embodiment, the first sensor module further includes first memory (e.g., memory 628) storing data for a neural network (e.g., neural network 632), and the first processing device uses the neural network to evaluate the sensor data from the first sensor.

In one embodiment, making the comparison of the first object data to the second object data comprises performing a statistical correlation of the first object data to the second object data.

In one embodiment, the instructions are further configured to instruct the central processing device to determine a context of the autonomous vehicle based on sensor data from at least one sensor other than the first sensor and the second sensor, and determining whether the first object data corresponds to the second object data is based in part on the context.

In one embodiment, the autonomous vehicle further comprises a host processing device, performing the action comprises sending a signal to the host processing device, and sending the signal causes the host processing device to change a configuration of a vehicle system of the autonomous vehicle.

In one embodiment, the first sensor is a lidar or radar sensor, and the second sensor is a camera.

In one embodiment, the first processing device is a system on chip, a field-programmable gate array, a graphics processing unit, or an application specific integrated circuit.

In one embodiment, the first object data comprises a position of an object detected by the first sensor module, and the second object data comprises a position of an object detected by the second sensor module.

In one embodiment, determining whether the first object data corresponds to the second object data comprises comparing a number of times that the first object data matches the second object data to a threshold.

In one embodiment, the instructions are further configured to instruct the central processing device to determine whether a current time for the autonomous vehicle corresponds to daytime or nighttime, and the threshold is a first threshold during the daytime, and is a second threshold during the nighttime.

In one embodiment, the threshold is a predetermined percentage of a total number of comparisons.

In one embodiment, performing the action associated with operation of the autonomous vehicle comprises sending a signal that causes a host processing device of the autonomous vehicle to perform a diagnostic test of at least one of the first sensor module or the second sensor module.

In one embodiment, the first object data includes a first type of detected object, wherein the second object data includes a second type of detected object, and making the comparison of the first object data to the second object data comprises comparing the first type to the second type.

In one example, the central or host processing device can be one or more general-purpose processing devices such as a microprocessor, a central processing unit, or the like. More particularly, the central or host processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The central or host processing device can also be one or more special-purpose processing devices such as an application specific integrated circuit (ASIC), a field programmable gate array (FPGA), a digital signal processor (DSP), network processor, or the like. The central or host processing device is configured to execute instructions for performing the operations and steps discussed herein.

Figure 9:
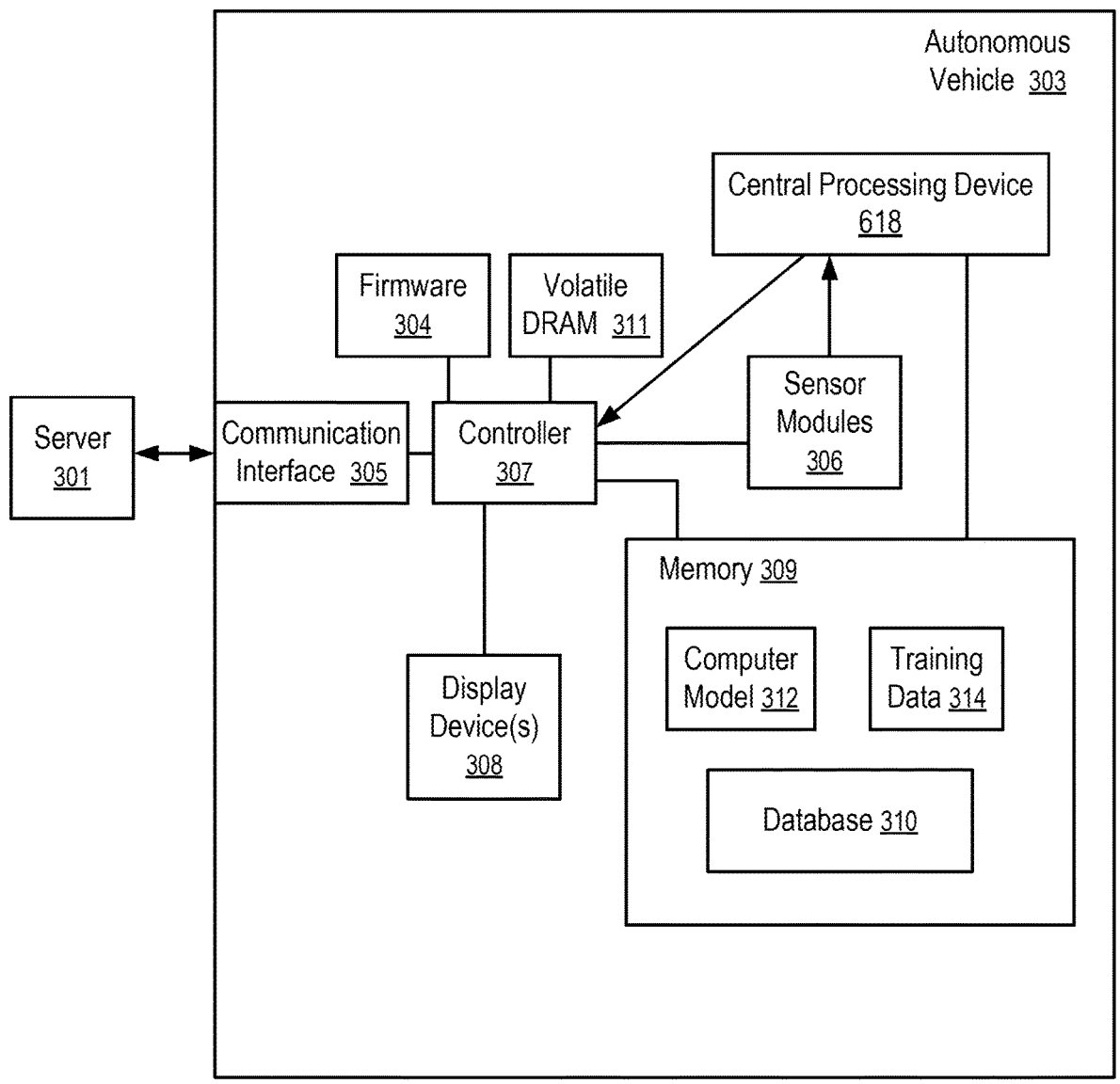
FIG. 9 shows an autonomous vehicle controlled and/or configured in response to determining that object data from a first sensor module of the vehicle does not correspond to object data from a second sensor module of the vehicle, according to one embodiment.

FIG. 9 shows an autonomous vehicle 303 controlled and/or configured in response to determining that object data from a first sensor module of the vehicle does not correspond to object data from a second sensor module of the vehicle, according to one embodiment. Sensor modules 306 provide object data for comparison to central processing device 618. Sensor modules 306 are an example of sensor modules 612, 614.

Based on comparing the object data from sensor modules 306, Central processing device 618 sends a signal to a controller 307. Controller 307 is an example of host processing device 620. In one example, in response to receiving the signal, controller 307 causes a display to a user on one or more display devices 308. In one example, the display presents information in a user interface indicating to the user that a failure has been detected. In one example, the presentation indicates the components identified as having failed. Display device 308 is an example of a vehicle system 622.

Memory 309 stores a computer model 312 and training data 314. Computer model 312 is an example of neural network 632. In one example, computer model 312 and/or training data 314 are used to configure and/or update one or more of sensor modules 306. In one example, an update for computer model 312 and/or training data 314 is received from server 301.

Systems of vehicle 303 include display device 308 or other device, system, or component. In one example, controller 307 is included in a memory device 180, and controller 307 controls collection of data from various systems of the vehicle 303.

Server 301 may store, for example, event data 160 collected by controller 307 and sent to server 301. The event data may include object data provided by Central processing device 618.

Server 301 may determine, using event data 160 and/or other data provided by central processing device 618, that a sensor component and/or sensor software (e.g., executing on central processing device 618) of vehicle 303 is operating improperly. In response to this determination, server 301 may cause the controller 307 to terminate an autonomous navigation mode. Other actions can be performed in response to this determination including, for example, configuring vehicle 303 by updating firmware 304, updating computer model 312, updating data in database 310, and/or updating training data 314.

The controller 307 may receive data collected by one or more sensor modules 306. The sensor modules 306 may be, for example, mounted in the autonomous vehicle 303. The sensor modules 306 may include, for example, a camera, a microphone, a motion detector, and/or a camera. At least a portion of the sensor modules may provide data associated with objects newly detected by vehicle 303 during travel.

The sensor modules 306 may provide various types of data for collection by the controller 307 and/or central processing device 618. For example, the collected data may include image data from the camera and/or audio data from the microphone.

In one embodiment, the central processing device 618 and/or controller 307 analyzes the collected data from the sensor modules 306. The analysis of the collected data includes providing some or all of the collected data as one or more inputs to a computer model 312. The computer model 312 can be, for example, an artificial neural network trained by deep learning. In one example, the computer model is a machine learning model that is trained using training data 314. The computer model 312 and/or the training data 314 can be stored, for example, in memory 309. An output from the computer model 312 can be transmitted to server 301 as part of object data.

In one embodiment, memory 309 stores a database 310, which may include data collected by sensor modules 306 and/or data received by a communication interface 305 from computing device, such as, for example, a server 301. In one example, this communication may be used to wirelessly transmit collected data from the sensor modules 306 to the server 301. The received data may include configuration, training, and other data used to configure control of the display devices 308 or other vehicle systems by controller 307. The received data may also be used to update a configuration of a machine learning model stored in memory 309 as computer model 312.

In one embodiment, firmware 304 controls, for example, the operations of the controller 307 in controlling components of vehicle 303. The controller 307 also can, for example, run the firmware 304 to perform operations responsive to communications from the server 301. The autonomous vehicle 303 includes volatile Dynamic Random-Access Memory (DRAM) 311 for the storage of run-time data and instructions used by the controller 307. The run-time data and/or instructions can be part of the data downloaded in response to detecting an event.

At least some embodiments of the systems and methods disclosed herein can be implemented using computer instructions (e.g., firmware) executed by a controller or processor. In some instances, hardware circuits can be used to implement at least some of the functions of the firmware. The firmware can be initially stored in non-volatile storage media or another non-volatile device, and loaded into volatile DRAM and/or the in-processor cache memory for execution. In one example, the firmware can be configured to control collection of data from a vehicle.

Figure 10:
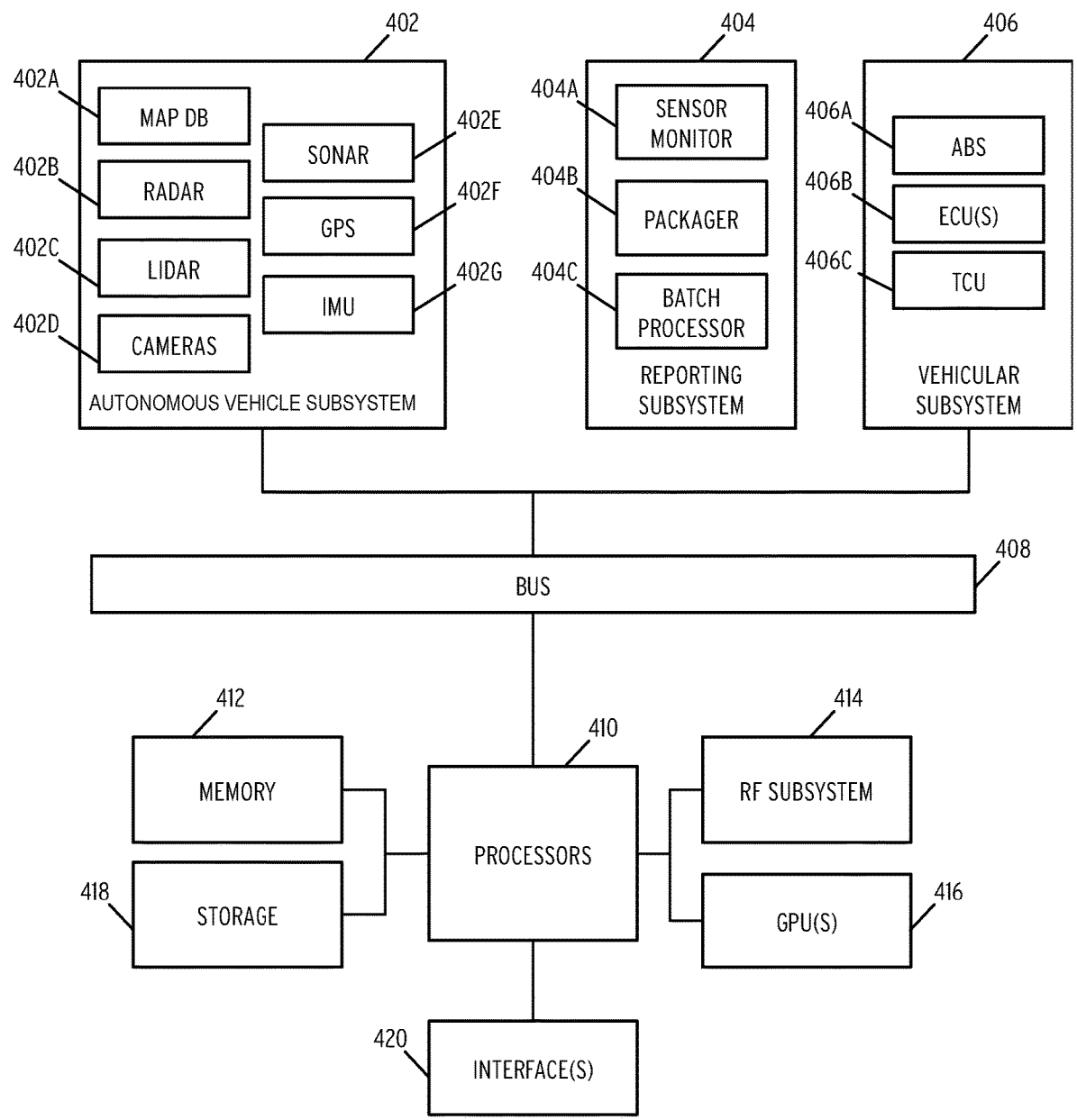
FIG. 10 is a block diagram of an autonomous vehicle including one or more various components and/or subsystems, each of which can be updated in various embodiments to configure the vehicle and/or perform other actions associated with the vehicle.

FIG. 10 is a block diagram of an autonomous vehicle (e.g., vehicle 610) including one or more various components and/or subsystems, each of which can be updated in various embodiments to configure the vehicle and/or perform other actions associated with the vehicle (e.g., changing operation of a vehicle system, updating a configuration, and/or other actions performed in response to identifying a sensor-related failure based on comparison of object data provided by sensor modules). The system illustrated in FIG. 10 may be installed entirely within a vehicle.

The system includes an autonomous vehicle subsystem 402. Subsystem 402 is an example of vehicle system 622 of FIG. 1. In the illustrated embodiment, autonomous vehicle subsystem 402 includes map database 402A, radar devices 402B, lidar devices 402C, digital cameras 402D, sonar devices 402E, GPS receivers 402F, and inertial measurement units 402G. Each of the components of autonomous vehicle subsystem 402 comprise standard components provided in most current autonomous vehicles. In one embodiment, map database 402A stores a plurality of high-definition three-dimensional maps used for routing and navigation. Radar devices 402B, lidar devices 402C, digital cameras 402D, sonar devices 402E, GPS receivers 402F, and inertial measurement units 402G may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem 406 is additionally included within the system. Vehicular subsystem 406 includes various antilock braking systems 406A, engine control units 402B, and transmission control units 402C. These components may be utilized to control the operation of the autonomous vehicle in response to the streaming data generated by autonomous vehicle subsystem 402. The standard autonomous vehicle interactions between autonomous vehicle subsystem 402 and vehicular subsystem 406 are generally known in the art and are not described in detail herein.

The processing side of the system includes one or more processors 410, short-term memory 412, an RF subsystem 414, graphics processing units (GPUs) 416, long-term storage 418 and one or more interfaces 420.

The one or more processors 410 may comprise central processing units, FPGAs, or any range of processing devices needed to support the operations of the autonomous vehicle. Memory 412 comprises DRAM or other suitable volatile RAM for temporary storage of data required by processors 410. RF system 414 may comprise a cellular transceiver and/or satellite transceiver. Long-term storage 418 may comprise one or more high-capacity solid-state drives (SSDs). In general, long-term storage 418 may be utilized to store, for example, high-definition maps, routing data, and any other data requiring permanent or semi-permanent storage. GPUs 416 may comprise one more high throughput GPU devices for processing data received from autonomous vehicle subsystem 402. Finally, interfaces 420 may comprise various display units positioned within the autonomous vehicle (e.g., an in-dash screen).

The system additionally includes a reporting subsystem 404 which performs data collection (e.g., collection of data obtained from sensors of the vehicle that is used to drive the vehicle). The reporting subsystem 404 includes a sensor monitor 404A which is connected to bus 408 and records sensor data transmitted on the bus 408 as well as any log data transmitted on the bus. The reporting subsystem 404 may additionally include one or more endpoints to allow for system components to transmit log data directly to the reporting subsystem 404.

The reporting subsystem 404 additionally includes a packager 404B. In one embodiment, packager 404B retrieves the data from the sensor monitor 404A or endpoints and packages the raw data for transmission to a central system (illustrated in FIG. 11). In some embodiments, packager 404B may be configured to package data at periodic time intervals. Alternatively, or in conjunction with the foregoing, packager 404B may transmit data in real-time and may compress data to facilitate real-time communications with a central system.

The reporting subsystem 404 additionally includes a batch processor 404C. In one embodiment, the batch processor 404C is configured to perform any preprocessing on recorded data prior to transmittal. For example, batch processor 404C may perform compression operations on the data prior to packaging by packager 404B. In another embodiment, batch processor 404C may be configured to filter the recorded data to remove extraneous data prior to packaging or transmittal. In another embodiment, batch processor 404C may be configured to perform data cleaning on the recorded data to conform the raw data to a format suitable for further processing by the central system.

Each of the devices is connected via a bus 408. Bus 408 is an example of bus 174 of FIG. 3. In one embodiment, the bus 408 may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 11:
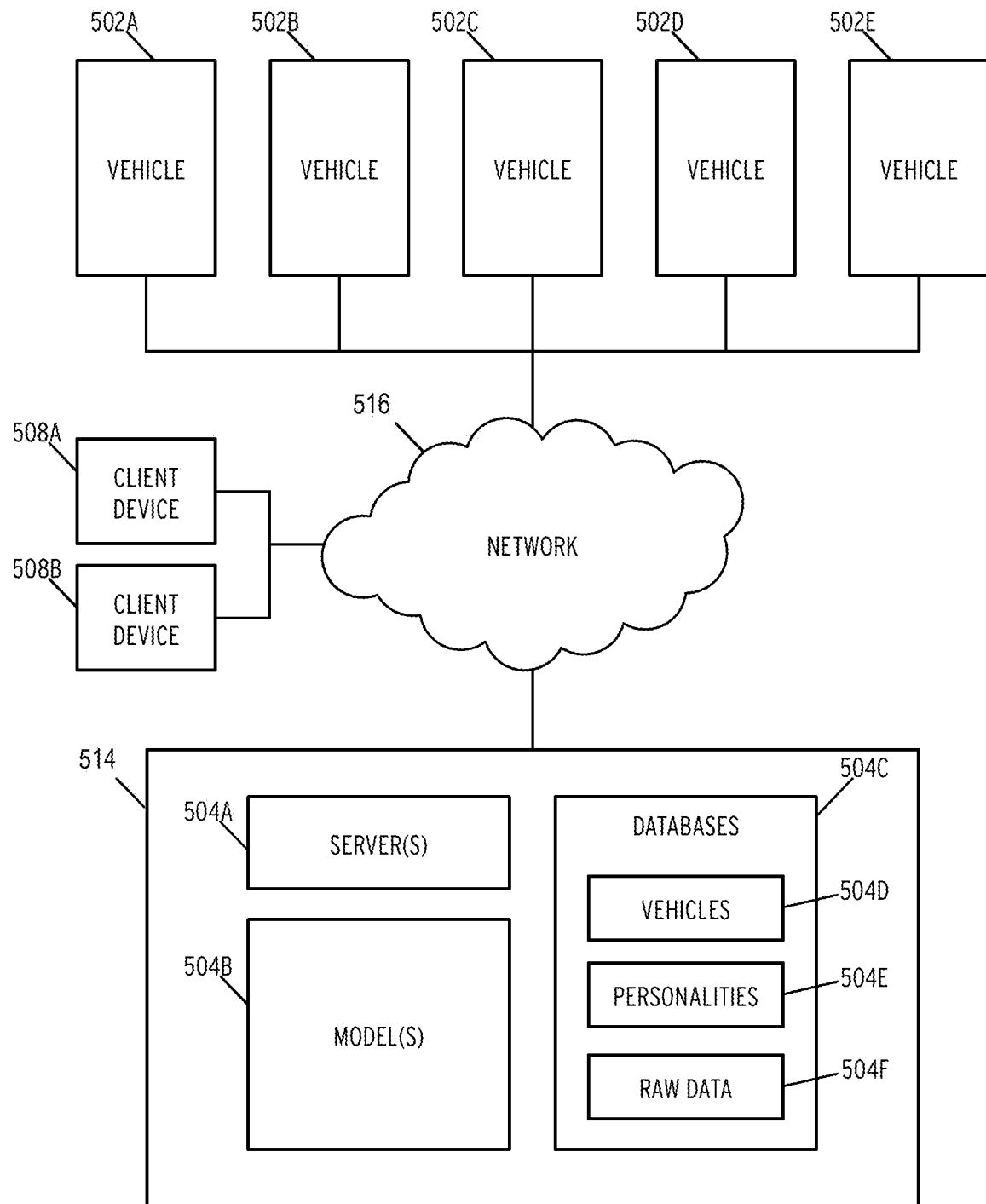
FIG. 11 is a block diagram of a centralized autonomous vehicle operations system, according to various embodiments.

FIG. 11 is a block diagram of a centralized autonomous vehicle operations system, according to various embodiments. As illustrated, the system includes a number of autonomous vehicles 502A-502E. Each vehicle is an example of vehicle 610.

In one embodiment, each autonomous vehicle may comprise an autonomous vehicle such as that depicted in FIG. 10. Each autonomous vehicle 502A-502E may communicate with a central system 514 via a network 516. In one embodiment, network 516 comprises a global network such as the Internet. In one example, central system 514 is implemented using one or more of servers 101 or 301.

The system additionally includes a plurality of client devices 508A, 508B. In the illustrated embodiment, client devices 508A, 508B may comprise any personal computing device (e.g., a laptop, tablet, mobile phone, etc.). Client devices 508A, 508B may issue requests for data from central system 514. In one embodiment, client devices 508A, 508B transmit requests for data to support mobile applications or web page data, as described previously.

In one embodiment, central system 514 includes a plurality of servers 504A. In one embodiment, servers 504A comprise a plurality of front end webservers configured to serve responses to client device 508A, 508B. The servers 504A may additionally include one or more application servers configured to perform various operations to support one or more vehicles.

In one embodiment, central system 514 additionally includes a plurality of models 504B. In one embodiment, models 504B may store one or more neural networks for classifying autonomous vehicle objects. The models 504B may additionally include models for predicting future events. In some embodiments the models 504B may store a combination of neural networks and other machine learning models.

Central system 514 additionally includes one or more databases 504C. The databases 504C may include database record for vehicles 504D, personalities 504E, and raw data 504F. Raw data 504F may comprise an unstructured database for storing raw data received from sensors and logs as discussed previously.

The present disclosure includes methods and apparatuses which perform the methods described above, including data processing systems which perform these methods, and computer readable media containing instructions which when executed on data processing systems cause the systems to perform these methods.

A server and/or a computing device of a vehicle above can be implemented as one or more data processing systems. A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An autonomous vehicle comprising:
    a first sensor module comprising a first sensor and a first processing device, wherein the first processing device evaluates sensor data from the first sensor to provide first object data;
    a second sensor module comprising a second sensor and a second processing device, wherein the second processing device evaluates sensor data from the second sensor to provide second object data;
    a central processing device configured to receive object data provided by sensor modules of the autonomous vehicle; and
    memory storing instructions configured to instruct the central processing device to:
        receive the first object data based on a first detection of a target object by the first sensor;
        receive the second object data based on a second detection of the target object by the second sensor;
        determine whether a current time for the autonomous vehicle corresponds to daytime or nighttime;
        determine, based on at least one of the first object data or the second object data, a type of object;
        determine, based on the type of object, an expected correlation;
        make a comparison of the first object data to the second object data, the comparison comprising performing a statistical correlation of the first object data to the second object data to provide a result, and comparing the result to the expected correlation;
        determine, based on the comparison of the first object data to the second object data, whether the first object data corresponds to the second object data, wherein the determining comprises comparing a number of times that the first object data matches the second object data to a threshold, and wherein the threshold is a first threshold during the daytime, and a second threshold during the nighttime; and
        in response to determining that the first object data does not correspond to the second object data, perform a diagnostic test of at least one of the first sensor module or the second sensor module.

2. The autonomous vehicle of claim 1, wherein the type of object is selected from a plurality of object types.

3. The autonomous vehicle of claim 1, wherein the first sensor module further includes first memory storing data for a neural network, and wherein the first processing device uses the neural network to evaluate the sensor data from the first sensor.

4. The autonomous vehicle of claim 1, wherein the instructions are further configured to instruct the central processing device to determine a context of the autonomous vehicle based on sensor data from at least one sensor other than the first sensor and the second sensor, and wherein determining whether the first object data corresponds to the second object data is based in part on the context.

5. The autonomous vehicle of claim 1, further comprising a host processing device, wherein performing the diagnostic test comprises sending a signal that causes the host processing device to change a configuration of a vehicle system of the autonomous vehicle.

6. The autonomous vehicle of claim 1, wherein the first sensor is a lidar or radar sensor, and the second sensor is a camera.

7. The autonomous vehicle of claim 1, wherein the first processing device is a system on chip, a field-programmable gate array, a graphics processing unit, or an application specific integrated circuit.

8. The autonomous vehicle of claim 1, wherein the first object data comprises a position of an object detected by the first sensor module, and the second object data comprises a position of an object detected by the second sensor module.

9. The autonomous vehicle of claim 1, wherein at least one of the first threshold or the second threshold is a predetermined percentage of a total number of comparisons.

10. The autonomous vehicle of claim 1, wherein the first object data includes a first type of detected object, wherein the second object data includes a second type of detected object, and wherein making the comparison of the first object data to the second object data comprises comparing the first type to the second type.

11. A method for an autonomous vehicle, the method comprising:
    receiving first object data based on a first detection of a target object from a first sensor module;
    receiving second object data based on a second detection of the target object from a second sensor module;
    determining whether a current time for the autonomous vehicle corresponds to daytime or nighttime;
    determining, based on at least one of the first object data or the second object data, a type of object;
    determining, based on the type of object, an expected correlation;
    comparing the first object data to the second object data, the comparing comprising performing a statistical correlation of the first object data to the second object data to provide a result, and comparing the result to the expected correlation;

determining, based on comparing the first object data to the second object data, whether the first object data corresponds to the second object data, wherein the determining comprises comparing a number of times that the first object data matches the second object data to a threshold, and wherein the threshold is a first threshold during the daytime, and a second threshold during the nighttime; and in response to determining that the first object data does not correspond to the second object data, performing a diagnostic test of at least one of the first sensor module or the second sensor module.

12. The method of claim 11, wherein the first sensor module comprises a processing device configured to process raw data from a sensor.

13. The method of claim 11, wherein the first object data comprises a position and object type for an object detected by the first sensor module, and the second object data comprises a position and object type for an object detected by the second sensor module.

14. The method of claim 11, wherein the first object data corresponds to an object detected by a sensor of the first sensor module, and the second object data corresponds to an object detected by a sensor of the second sensor module.

15. The method of claim 11, wherein determining whether the first object data corresponds to the second object data comprises determining whether a statistical detection relationship is maintained between the first object data and the second object data.

16. A system comprising:
a central processing device configured to receive object data provided by sensors of an autonomous vehicle; and
memory storing instructions configured to instruct the central processing device to:
receive first object data based on a first detection of a target object by a first sensor of the vehicle;
receive second object data based on a second detection of the target object by a second sensor of the vehicle;
determine, based on at least one of the first object data or the second object data, a type of object;
determine, based on the type of object, an expected correlation;
make a comparison of the first object data to the second object data, the comparison comprising performing a statistical correlation of the first object data to the second object data to provide a result, and comparing the result to the expected correlation;
determine, based on the comparison of the first object data to the second object data, whether the first object data corresponds to the second object data; and
in response to determining that the first object data does not correspond to the second object data, perform a diagnostic test of at least one of the first sensor or the second sensor.

17. The system of claim 16, wherein the instructions are further configured to instruct the central processing device to change, based on the diagnostic test, a configuration of at least one of the first sensor or the second sensor.

18. The system of claim 16, wherein the instructions are further configured to instruct the central processing device to determine, based on the diagnostic test, that a malfunction exists in at least one of the first sensor or the second sensor.

* * * * *